(12) United States Patent
Zhang et al.

(10) Patent No.: US 9,237,157 B2
(45) Date of Patent: Jan. 12, 2016

(54) DATA PROCESSING AND STORAGE DEVICE

(75) Inventors: Zhibo Zhang, Shanghai (CN); Yanjun Xu, Shanghai (CN); Changsheng Shan, Shanghai (CN); Xiaobin Yu, Shanghai (CN); Wenwen Yu, Shanghai (CN); Yu Cao, Shanghai (CN)

(73) Assignee: CHINA UNIONPAY CO., LTD., Shanghai (CN)

( * ) Notice: Subject to any disclaimer, the term of this patent is extended or adjusted under 35 U.S.C. 154(b) by 108 days.

(21) Appl. No.: 14/127,467

(22) PCT Filed: Jul. 11, 2012

(86) PCT No.: PCT/CN2012/078460
§ 371 (c)(1),
(2), (4) Date: Apr. 9, 2014

(87) PCT Pub. No.: WO2013/007189
PCT Pub. Date: Jan. 17, 2013

(65) Prior Publication Data
US 2014/0223517 A1    Aug. 7, 2014

(30) Foreign Application Priority Data

Jul. 13, 2011  (CN) .......................... 2011 1 0196045

(51) Int. Cl.
*H04L 29/06* (2006.01)
*G06K 7/10* (2006.01)
*G06K 19/077* (2006.01)

(52) U.S. Cl.
CPC ............ *H04L 63/10* (2013.01); *G06K 7/10247* (2013.01); *G06K 19/07732* (2013.01); *G06K 19/07733* (2013.01)

(58) Field of Classification Search
CPC .. H04L 29/06; H04L 63/10; G06K 19/07732; G06K 19/0773; G06K 7/10247
See application file for complete search history.

(56) References Cited

U.S. PATENT DOCUMENTS

2005/0164732 A1*  7/2005  Denk et al. ................. 455/552.1
2005/0224589 A1* 10/2005  Park et al. ..................... 235/492

(Continued)

FOREIGN PATENT DOCUMENTS

| CN | 101789152 A | 7/2010 |
| CN | 201638250   | 11/2010 |

(Continued)

OTHER PUBLICATIONS

Steffens et al., The SIM-based mobile wallet, Oct. 2009, International Conference on Intelligence in Next Generation Networks, pp. 1-6.*
Translation of First Office Action (Application No. 201110196045.7).

*Primary Examiner* — Kenneth Chang
(74) *Attorney, Agent, or Firm* — Blakely Sokoloff Taylor & Zafman LLP

(57) ABSTRACT

A device for processing and storing data is disclosed, which comprises a primary controller, a primary memory, a security element (SE), and at least one universal port, wherein the device for processing and storing data further includes a first additional port, via which the security element (SE) can directly interacts with a second external device to complete the processing and access of the data. The security element (SE) in the device for processing and storing data disclosed herein can work independently without being effected by the condition whether the primary memory is performing the data read/write process, and supports the single wire protocol (SWP).

10 Claims, 2 Drawing Sheets

(56) References Cited

U.S. PATENT DOCUMENTS

| | | | |
|---|---|---|---|
| 2006/0124755 A1* | 6/2006 | Ito | 235/492 |
| 2006/0208066 A1* | 9/2006 | Finn | G06K 7/0004 |
| | | | 235/380 |
| 2007/0145152 A1* | 6/2007 | Jogand-Coulomb et al. | 235/492 |
| 2008/0219444 A1* | 9/2008 | Benteo et al. | 380/255 |
| 2008/0224825 A1* | 9/2008 | Nystrom et al. | 340/10.1 |
| 2009/0006845 A1* | 1/2009 | Charbonnier | H04L 63/10 |
| | | | 713/156 |
| 2009/0312011 A1* | 12/2009 | Huomo et al. | 455/426.1 |
| 2011/0042456 A1* | 2/2011 | Masaryk | G06Q 20/20 |
| | | | 235/380 |
| 2011/0180610 A1* | 7/2011 | Narendra et al. | 235/492 |

FOREIGN PATENT DOCUMENTS

| | | |
|---|---|---|
| CN | 101937520 A | 1/2011 |
| CN | 201766639 U | 3/2011 |
| CN | 102163273 A | 8/2011 |
| CN | 102279940 A | 12/2011 |
| CN | 202075746 U | 12/2011 |
| CN | 102325203 A | 1/2012 |
| CN | 202306637 U | 7/2012 |
| CN | 202351915 U | 7/2012 |
| EP | 2 161 680 A1 | 3/2010 |

* cited by examiner

DATA PROCESSING AND STORAGE DEVICE

TECHNICAL FIELD

The present invention relates to a device for processing and storing data, and particularly, to a device for processing and storing data that supports single wire protocol.

BACKGROUND

Nowadays, with the rapid development and popularization of the near-field communication (NFC) technology and the increasing enrichment of the business applications in different field, such as the financial transaction field, the mobile payment solutions based on the NFC technology become more and more important.

In general, existing mobile payment solutions can be divided into the following two types: (1) a SIM card-based NFC solution, in which a contactless antenna and a contactless communication frontend (CLF) are integrated in a mobile phone, while a security element (SE) is integrated in a SIM card, which communicates with the contactless antenna and the CLF via a particular communication protocol, e.g., the single wire protocol; and (2) an SD card-based remote mobile payment solution, in which a security element (SE) is integrated in a SD card, and the access to the security element is made by using a particular client application to call a file interface of a standard SD card, and thereby the remote mobile payment process is implemented.

However, the first solution described above is disadvantageous in that it does not support concurrent processing due to the small storage capacity of the existing SIM cards, which is usually 80-100 kB, and this makes it difficult to extend the applications of NFC-based mobile payment in various business categories.

The second solution described above is also disadvantageous for the following reasons: NFC-based mobile payment application may not be supported because a particular client application is required to access to the security element (SE) so as to call a file interface of a standard SD card; because the security element (SE) and the primary processor (i.e., the SDC) and the primary memory (i.e., a FLASH memory) in the SD card share the powering of the SD card interface, the powering of the security element (SE) may be insufficient or inversely effected such that it can not work properly; because the access to the security element (SE) requires the calling of the file interface of the SD card, the external device will not be able to access the security element (SE) during the writing or reading process of the SD card, and thus this will limit the time for transaction.

Therefore, there exists the need for a device for processing and storing data that supports the single wire protocol and a mobile terminal that includes such device for processing and storing data.

SUMMARY

In order to solve aforementioned problems of the existing solutions, a device for processing and storing data is disclosed in the present application.

One of the objects of the present invention is implemented by the following technical solution:

A device for processing and storing data, the device comprises a primary controller, a primary memory, a security element (SE), and at least one universal port, wherein based on a first communication protocol, the primary controller controls the primary memory and/or the security element (SE) to interact with a first external device via the at least one universal port so as to complete the processing and access of the data;

characterized in that, the device for processing and storing data further includes a first additional port, via which the security element (SE) interacts with a second external device based on a second communication protocol to complete the processing and access of the data.

In the solutions as disclosed above, preferably, the device for processing and storing data further includes a second additional port, via which the security element (SE) is powered.

In the solutions as disclosed above, preferably, the second communication protocol is the single wire protocol (SWP).

In the solutions as disclosed above, preferably, the first communication protocol is the secure digital (SD) card interface protocol.

In the solutions as disclosed above, preferably, the at least one universal ports are 8 contacts PIN1-8 defined in the security digital (SD) card interface protocol.

In the solutions as disclosed above, preferably, the first external device is a baseband chip in a mobile device.

In the solutions as disclosed above, preferably, the second external device is a near-field communication (NFC) controller chip.

In the solutions as disclosed above, preferably, the security element (SE) is used to process and store security information data, and wherein the processing includes data-based operations.

In the solutions disclosed above, preferably, the primary memory is a FLASH memory.

In the solutions as disclosed above, preferably, the device for processing and storing data has a shape of a normal SD card.

In the solutions as disclosed above, preferably, the 8 contacts PIN1-8 are arranged in a row, while the first additional port and the second additional port are arranged in another row.

The objects of the present invention can also be implemented by the following technical solutions:

A mobile terminal including the device for processing and storing data as described above.

The device for processing and storing data has the following advantages: (1) the security element (SE) can work independently without being effected by the data read/write process which is being performed in the primary memory; (2) the single wire protocol (SWP) is supported, and thus the security element (SE) can directly communication with a near-field communication (NFC) controller chip; and (3) the capacity of the primary memory and the security element (SE) is relatively large, and thus allowing for expanding mobile payment applications of various categories that are based-on the NFC technology.

BRIEF DESCRIPTION OF DRAWINGS

The features and advantages of the present invention will be better understood by one skilled in the art in connection with the drawings, in which.

DETAILED DESCRIPTION

Figure 1:
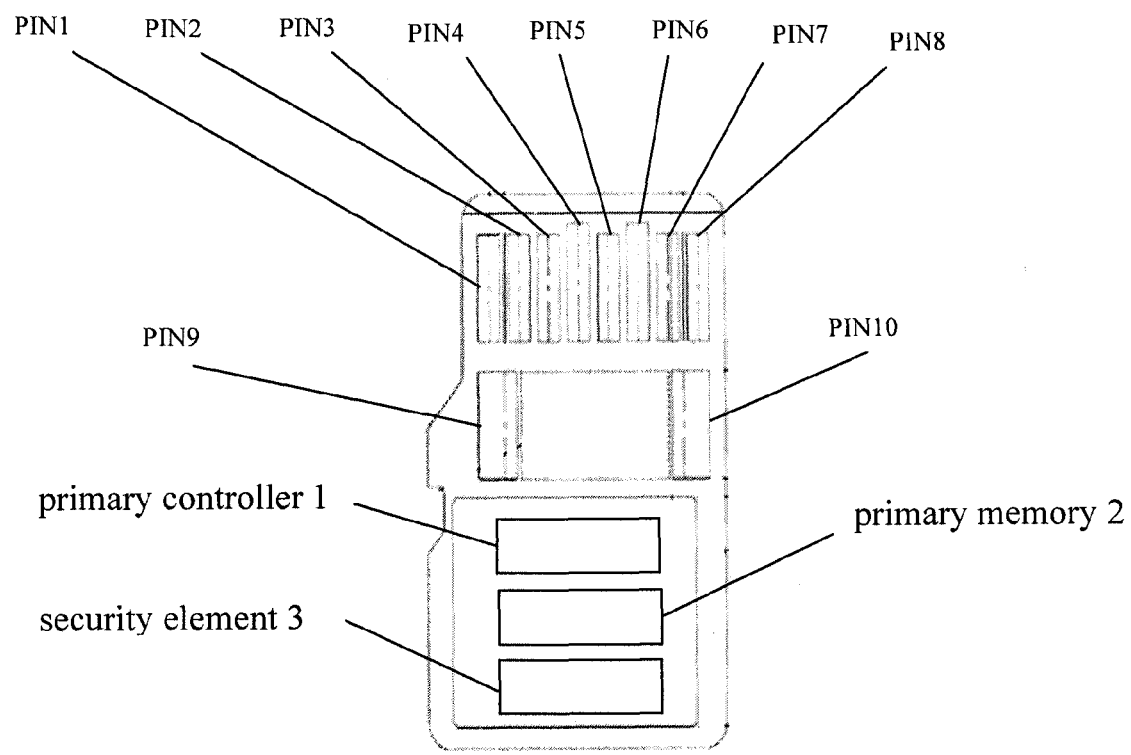
FIG. 1 is a schematic view of the structure of the device for processing and storing data according to the embodiment of the present invention.

FIG. 1 is a schematic view of the structure of the device for processing and storing data according to the embodiment of the present invention. As shown in FIG. 1, the device for processing and storing data as disclosed herein includes a primary controller 1, a primary memory 2, a security element (SE) 3, and at least one universal ports (PIN1-8). The primary controller 1 controls the primary memory 2 and/or the security element (SE) 3 based on a first communication protocol to interact with a first external device via the at least one universal port so as to complete the processing and access of the data. Moreover, the device for processing and storing data further includes a first additional port (PIN9), via which the security element (SE) 3 interacts with a second external device based on a second communication protocol to complete the processing and access of the data.

Preferably, in the device for processing and storing data as disclosed herein, the device for processing and storing data further includes a second additional port (PIN10), via which the security element (SE) 3 is powered. As an example, the powering voltage of the second additional port (PIN10) is from a near-field communication (NFC) controller chip, for example, a contactless frontend CLF.

Preferably, in the device for processing and storing data as disclosed herein, the second communication protocol is the single wire protocol (SWP).

Preferably, in the device for processing and storing data as disclosed herein, the first communication protocol is the secure digital (SD) card interface protocol.

As an example, in the device for processing and storing data as disclosed herein, the at least one universal ports are 8 contacts PIN1-8 defined in the security digital (SD) card interface protocol.

As an example, in the device for processing and storing data as disclosed herein, the first external device is a baseband chip in a mobile device.

As an example, in the device for processing and storing data as disclosed herein, the second external device is a near-field communication (NFC) controller chip, such as a contactless frontend CLF.

As an example, in the device for processing and storing data as disclosed herein, the security element (SE) 3 is used to process and store security information data, such as the data used for authenticating financial transactions. The processing mentioned above includes data-based operations, such as encryption and decryption operations.

As an example, in the device for processing and storing data as disclosed herein, the primary memory 2 is a FLASH memory.

As an example, as shown in FIG. 1, in the device for processing and storing data as disclosed herein, the device for processing and storing data has a shape of a normal SD card.

Figure 2:
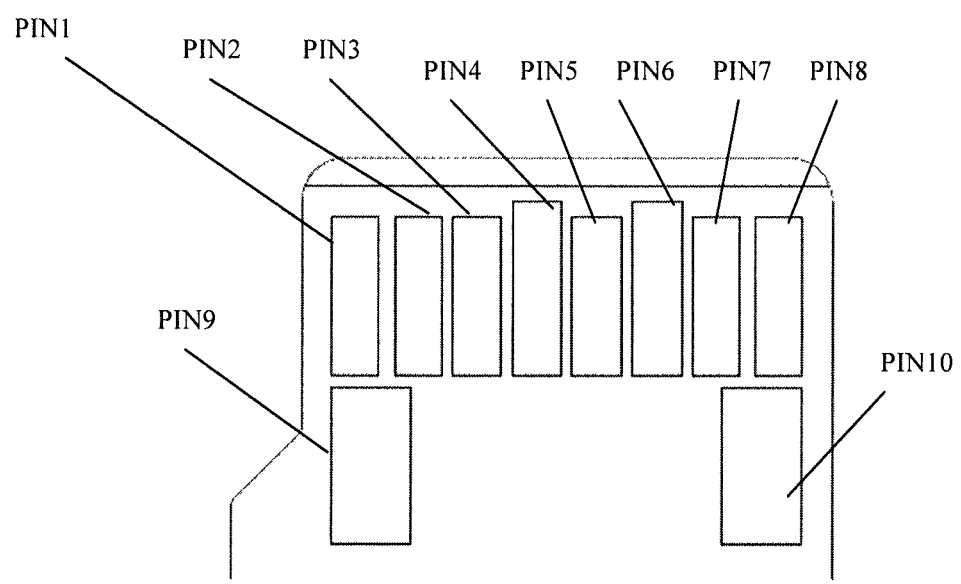
FIG. 2 is a schematic view of the layout of the terminals (contacts) of the device for processing and storing data according to the embodiment of the present invention.

FIG. 2 is a schematic view of the layout of the terminals (contacts) of the device for processing and storing data according to the embodiment of the present invention.

As shown in FIG. 2, in the device for processing and storing data as disclosed herein, the 8 contacts PIN1-8 are arranged in a row, while the first additional port (PINS) and the second additional port (PIN10) are arranged in another row.

As an example, the definitions of the contacts PIN1-10 are shown in Table 1.

TABLE 1

| PIN number | Name | Type | Function description |
| --- | --- | --- | --- |
| 1 | DAT2 | I/O | Data line [Bit 2] |
| 2 | CD/DAT3 | I/O | Card surveillance/data line [Bit 3] |
| 3 | CMD | P | Command/response |

TABLE 1-continued

| PIN number | Name | Type | Function description |
| --- | --- | --- | --- |
| 4 | VCC | P | Powering voltage |
| 5 | CLK | I | clock |
| 6 | VSS | G | ground |
| 7 | DAT0 | I/O | Data line [Bit 0] |
| 8 | DAT1 | I/O | Data line [Bit 1] |
| 9 | SWPIO | I/O | SWP data line |
| 10 | VCCSWP | P | Powering voltage from CLF |

As an example, the basic operating principle of the device for processing and storing data as disclosed herein is as follows:

The primary controller 1 controls the primary memory 2 (e.g., the FLASH memory) and/or the security element (SE) 3 based on a first communication protocol (e.g., the secure digital (SD) card interface protocol) to interact with a first external device (e.g., a baseband chip of a mobile terminal) via the at least one universal port (PIN1-8) so as to complete the processing and access of the data; the security element (SE) 3 interacts with a second external device (e.g., a contactless frontend CLF) via a first additional port (PIN9) based on a second communication protocol (e.g., the SWP protocol) to complete the processing and access of the data, wherein the security element (SE) 3 is powered via a second additional port (PIN10). As can be seen, in the device for processing and storing data as disclosed herein, for example, the security element (SE) implements the single wire protocol (SWP) via a contact PIN9, and can be individually powered separately from the original powering system of the SD card via contact PIN10. Hence, the security element (SE) can work independently without being effected by the condition whether the data is being written into/read from the SD card.

As an example, in the mobile payment field, when the device for processing and storing data as disclosed herein is used in a mobile terminal, the following functionalities can be performed by the mobile terminal: When the SD card is used for remote payment, the client application will access the security element (SE) in the SD card via the 8 traditional contacts PIN1-8 defined in the original secure digital (SD) card interface protocol; while during the NFC payment in the field, the security element (SE) communicates with the NFC controller chip (such as a contactless frontend CLF) in the mobile terminal directly via PIN9 based on the SWP protocol, and then the NFC controller chip performs protocol transformation operation (i.e., the SWP protocol will be converted into the contactless communication protocol), and thus it can interact with the receiving terminal to implement the transaction function.

As an example, in the mobile payment field, when the device for processing and storing data as disclosed herein is used in a mobile terminal, the following functionalities can also be performed by the mobile terminal: When the device for processing and storing data as disclosed herein is inserted into the mobile terminal, the mobile terminal need not to be powered on for the security element (SE) to work properly so as to implement the NFC-based transaction function. Moreover, the present invention is also intended to encompass a mobile terminal including the device for processing and storing data described above.

Although the present invention has been described with the above preferred embodiments, the implementation of the invention is not limited to these embodiments. It should be appreciated that various changes and modifications may be made to the present invention by one skilled in the art without departing from the spirit and scope of the present invention.

The invention claimed is:

1. A device for processing and storing data, the device comprising:
   a primary controller;
   a primary memory;
   a security element (SE) configured to operate independently without being effected by data read/write processes performed in the primary memory and to expand mobile payment applications;
   at least one universal port, wherein based on a first communication protocol, the primary controller controls the primary memory and/or the security element (SE) to interact with a first external device via the at least one universal port so as to complete the processing and access of the data, wherein the at least one universal port includes a plurality of pins; and
   a first additional pin, via which the security element (SE) interacts with a near-field communication (NFC) controller chip of a second external device based on a second communication protocol to complete the processing and access of the data, wherein the second communication protocol is single wire protocol (SWP).

2. The device for processing and storing data of claim 1, further comprising: a second additional pin, via which the security element (SE) is powered, wherein the first and second additional pins are separate from the plurality of pins included in the at least one universal port.

3. The device for processing and storing data of claim 2, characterized in that, the first communication protocol is secure digital (SD) card interface protocol.

4. The device for processing and storing data of claim 3, characterized in that, the at least one universal port includes 8 contacts PIN1-8 defined in secure digital (SD) card interface protocol.

5. The device for processing and storing data of claim 4, characterized in that, the first external device is a baseband chip in a mobile device.

6. The device for processing and storing data of claim 5, characterized in that, security element (SE) processes and stores the security information data, and wherein the processing includes data-based operations.

7. The device for processing and storing data of claim 6, characterized in that, the primary memory is a FLASH memory.

8. The device for processing and storing data of claim 7, characterized in that, the device for processing and storing data has a shape of a normal SD card.

9. The device for processing and storing data of claim 8, characterized in that, the 8 contacts PIN1-8 are arranged in a row, while the first additional pin and the second additional pin are arranged in another row.

10. A mobile terminal including the device for processing and storing data according to any of claim 1, 2, 3-5, or 6-9.

* * * * *